Sept. 18, 1962
G. R. HOUCK
3,054,915
MOUNT FOR PIEZO-ELECTRIC CRYSTAL
Filed March 16, 1959
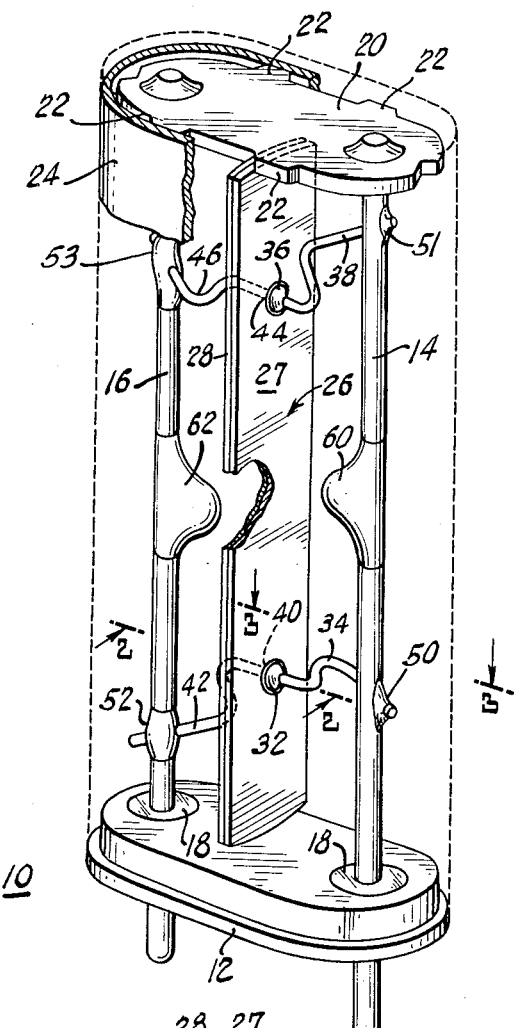
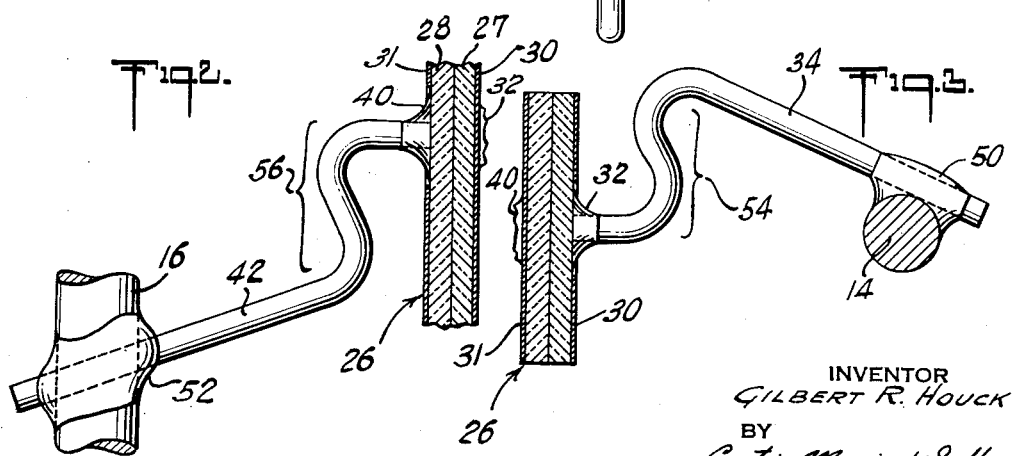
INVENTOR
GILBERT R. HOUCK
BY
Curtis, Morris & Safford
ATTORNEYS

United States Patent Office 3,054,915
Patented Sept. 18, 1962

3,054,915
MOUNT FOR PIEZO-ELECTRIC CRYSTAL
Gilbert R. Houck, New Cumberland, Pa., assignor to Hill Electronics, Inc., Mechanicsburg, Pa., a corporation of Pennsylvania
Filed Mar. 16, 1959, Ser. No. 799,759
6 Claims. (Cl. 310—9.1)

This invention relates to an improved mounting structure for a piezo-electric crystal.

An object of this invention is to provide a crystal mounting and supporting structure which is protected against vibrations caused externally by violent acceleration and deceleration, such as may be encountered in aircraft or missiles for example.

Still another object is to provide a mounting structure of this kind which is simple and inexpensive.

A more specific object is to provide a "JT" type quartz crystal unit which is able to operate satisfactorily over an extreme range of vibration and temperature.

These and other objects will in part be understood from and in part pointed out in the description given hereinafter.

In piezo-electric crystal units of the kind to which this invention is related, especially low frequency units, the crystal, usually a thin wafer of quartz, is supported as freely as possible so as not to interfere with its mode of vibration. To this end the quartz wafer is attached at two or more points on its surface to very flexible support wires which also serve as the electrical conductors to the crystal element. For proper operation, these wires must be flexible enough so that they do not appreciably damp the vibrations of the crystal and thereby undesirably lower its "Q." However, as the wires are made more and more flexible to achieve high Q, they become susceptible to vibrations, such as caused by the violent motion in space of the equipment in which the crystal unit is mounted, and, of course, as the amplitude of undesired vibration increases the metallurgical fatiguing effect on the wires rapidly increases. The present invention effectively eliminates this difficulty with undesired support vibration but does so without adversely damping the desired crystal vibration. Thus, the life of the crystal unit is greatly extended without any appreciable lowering of the Q of the crystal element itself and without other adverse effects.

In accordance with the present invention, in one specific embodiment thereof, a "JT" type quartz crystal wafer having a structure well known in the art, is attached to and supported by four thin, springy wires of unique configuration. These in turn are attached to two heavy, upright posts which also serve as electrical conductors. These posts at their lower end are rigidly supported by insulating beads passing through a base plate and at their upper ends are supported by a thin wafer of a soft plastic such as Teflon or the like. This wafer, to prevent the upper ends of the posts from vibrating, has integral tabs which snugly engage the inside of a rigid envelope which in turn fits over the crystal wafer and its supporting structure, the envelope being hermetically sealed to the base plate. About midway along each post is placed a lumped weight which effectively prevents unwanted resonances in these posts. The mounting of this unit is so effective that it will operate continuously without failure in an electrical circuit while subjected to vibrations or accelerating forces of ten times the force of gravity at up to 500 cycles per second and at any temperature from +110° C. to −65° C. A crystal of this type mounted in accordance with the prior art would electrically fail almost immediately under these conditions, and in all probability it would be permanently damaged or destroyed.

A better understanding of the invention together with a fuller appreciation of its many advantages will best be gained from the following description given in connection with the accompanying drawings wherein:

FIGURE 1 is an enlarged perspective view of a crystal unit embodying features of the invention, the outer envelope being broken away. The various elements of the unit are shown substantially exactly to scale.

FIGURE 2, taken on lines 2—2 in FIGURE 1, shows in enlarged detail and to scale one of the support wires of the unit; and FIGURE 3, taken on lines 3—3 in FIGURE 1, is similar to FIGURE 2 and shows another support wire.

The crystal unit 10 shown in FIGURE 1 comprises a thick metal base plate 12 through which are mounted two relatively large diameter metal support posts 14 and 16. They are insulated from plate 12 by a respective one of two glass beads 18 which are hermetically sealed to the posts and the plate. The upper ends of the posts are anchored in a wafer 20 of a suitable insulating and vibration damping material, such as Teflon. Extending from the sides of this wafer are four tabs 22 which fit tightly inside the upper end of a metal shell or envelope 24 (shown partly in dotted outline). The lower end of this envelope fits around the upper part of base plate 12 and is hermetically sealed to it. In usual practice, the region inside envelope 24 is evacuated of gas.

Spaced parallel to and positioned perpendicularly between posts 14 and 16 is a "JT" type quartz crystal 26 which as seen in FIGURE 2, for example, comprises two thin quartz wafers 27 and 28 conductively plated on both sides and bonded face-to-face. One outer conductive layer or face is designated by numeral 30 and the opposite layer by numeral 31.

Crystal 26 vibrates in a length-thickness flexural mode and to permit high Q or electrical activity it must be supported for minimum interference with this mode. To this end there is attached to face 30 at point 32 a thin, specially shaped wire 34, and at another point 36 a similar but differently shaped wire 38. Attached to the opposite face 31 at a point 40 opposite point 32 is another wire 42, similar to wire 38, and attached to face 31 at a point 44 opposite point 36 is a wire 46 similar to wire 34. A node of vibration of the crystal lies between points 32 and 40, and another node lies between points 36 and 44. The outer ends of wires 34, 38, 42, and 46 are soldered to corresponding ones of posts 14 and 16, at points 50, 51, 52, and 53 respectively.

As seen in FIGURE 1, wires 34 and 46 are positioned in parallel horizontal planes and though the same in shape are oppositely oriented relative to each other. Wires 38 and 42 lie substantially in a vertical plane perpendicular to crystal 26 and likewise are oppositely oriented and similarly shaped to each other. The particular shapes and positions of these wires are important in minimizing unwanted resonances and the effects of vibration.

Substantially the exact shape of wire 34 is shown in enlarged detail in FIGURE 3. Its left end adjacent point 32 is generally perpendicular to the face of the crystal and lies on a line approximately even with the center of post 14. It has an S-shaped bend 54 in it substantially as shown and its right portion is straight and makes a perpendicular tangent with post 14 at point 50. The spring action provided by wire 34 and the reverse bend in it minimizes resonances and the effects of external accelerating forces on the crystal unit. The actual straightened-out length is slightly longer than a quarter-wave length at the fundamental frequency of vibration of crystal 26. Wire 46 is substantially identical to wire 34 but is oppositely oriented to it in a parallel plane. In FIGURE 3, wire 42 attached at point 40 on the left side of the crystal is not shown but its end at point 40 lies along a straight line with the left end of wire 34 at point 32.

The shape of wire 42 is shown in enlarged detail in FIGURE 2 which is to the same scale as FIGURE 3. Wire 42 lies approximately in the vertical plane of posts 14 and 16 and it is tangentially attached at a slight upward angle to post 16 at point 52. The left portion of this wire is straight and its right portion is provided with a double hairpin bend 56 somewhat different in configuration from S-shaped bend 54 in wire 34. Wire 38 is similar to wire 42 and lies generally in the same plane but is oppositely oriented and its end as seen in FIGURE 1 is attached to the rear side of post 14 whereas the end of wire 42 is attached to the front side of post 42. The asymmetry of these wires helps minimize the amplitude of unwanted resonances.

Positioned on post 14 substantially midway between points 50 and 51 is a solder ball 60 which serves as a lumped weight to minimize resonances in the post. A similar solder ball 62 is carried by post 16.

In an actual crystal unit built substantially exactly as shown herein and intended for operation at about 4 kilocycles per second, crystal 26 was about 1 and $\%_{32}$ inch long, $\frac{1}{32}$ inch thick, and $\frac{13}{64}$ inch wide. Wires 34, 38, 42, and 46 were 0.010 inch in diameter Phosphor bronze, points 32 and 36 were about $\frac{3}{4}$ inch apart, and points 50 and 51 were about $\frac{7}{8}$ inch apart. Posts 14 and 16 were about $\frac{1}{2}$ inch apart. The exact positioning of solder balls 60 and 62 was important.

The above description of the invention is intended in illustration. Various changes or modifications in the embodiment described may occur to those skilled in the art and these may be made without departing from the spirit or scope of the invention as set forth.

I claim:

1. A ruggedized, JT type crystal unit comprising: a JT type crystal element having a generally rectangular shape, parallel opposite faces, and having two nodal points along its length, a pair of parallel conductive support posts, a base supporting one end of said posts, said crystal being positioned between and in a perpendicular plane relative to said posts, and four limber support wires attached between respective ones of said posts and to said crystal opposite said nodal points, each of said wires being effectively one-quarter wavelength long at the frequency of operation of said crystal element, each wire being doubled back in an S-shaped bend, each of said wires being nonsymmetrically positioned relative to said crystal and at least one other wire, a first two of said wires being alike and lying generally parallel to the plane of said posts, said remaining two wires being alike but unlike said first two wires, said remaining two wires lying in planes parallel to each other and generally perpendicular to said posts.

2. The structure as in claim 1 wherein the upper end of said posts is held by a flat member of resilient plastic material, said crystal and posts being enclosed within a rigid envelope secured to said base, said plastic member engaging an inside end of said envelope.

3. The structure as in claim 1 wherein the other end of said posts is secured by a thin wafer of high temperature resilient plastic material, each of said posts midway between said wires carrying a lumped weight to prevent unwanted resonance.

4. An anti-vibration mounted crystal unit comprising a base, a pair of parallel support posts rigidly supported from said base and extending therefrom in a vertical plane, a crystal element positioned generally between said posts, a first flexible support wire connected between one of said posts and a first point on one side of said crystal, a second flexible support wire connected between the other of said posts and a second point on the other side of said crystal, said first and second points and the ends of said wires lying generally along a line perpendicular to said crystal and through a node point, each of said wires having a reverse double bend in it near said crystal, each wire lying in a plane generally orthogonal to the plane of the other and to said crystal, one wire having two bends each substantially more than 90°, said other wire being slightly different in shape with one bend substantially more than 90° and the other bend about 90°, and an envelope surrounding said posts, wires and crystal.

5. An improved piezo-electric crystal unit of the character described comprising: a base, two parallel support posts mounted through said base, a JT type quartz crystal positioned between said posts, a first flexible support wire connected between one of said posts and a first point on one side of said crystal, a second flexible support wire connected between said one post and a second point on said one side of said crystal, a third flexible support wire connected between the other of said posts and a third point on the other side of said crystal, a fourth flexible support wire connected between said other post and a fourth point on said other side of said crystal, each of said wires being approximately a quarter-wavelength long at the frequency of operation of said crystal and having a double reverse bend in it, said first and fourth wires lying generally in parallel planes which are perpendicular to said posts, said second and third wires lying generally in the plane of said posts, said first and third points lying generally opposite a first nodal point of said crystal, said second and fourth points lying generally opposite a second nodal point and a rigid envelope surrounding said posts and crystal.

6. The structure as in claim 5 wherein each of said posts generally midway between said wires carries a lumped weight.

References Cited in the file of this patent

UNITED STATES PATENTS

| | | |
|---|---|---|
| 2,275,122 | Ziegler | Mar. 3, 1942 |
| 2,371,613 | Fair | Mar. 20, 1945 |
| 2,953,696 | Ruggles | Sept. 20, 1960 |

OTHER REFERENCES

Lane Publication "Duplex Crystals," February 1946, p. 59.